United States Patent
Yang

(10) Patent No.: US 12,389,385 B2
(45) Date of Patent: Aug. 12, 2025

(54) METHOD FOR TRANSMITTING INDICATION INFORMATION AND COMMUNICATIONS DEVICE

(71) Applicant: VIVO MOBILE COMMUNICATION CO., LTD., Guangdong (CN)

(72) Inventor: Yu Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 668 days.

(21) Appl. No.: 17/510,161

(22) Filed: Oct. 25, 2021

(65) Prior Publication Data

US 2022/0061069 A1    Feb. 24, 2022

Related U.S. Application Data

(63) Continuation of application No. PCT/CN2020/086107, filed on Apr. 22, 2020.

(30) Foreign Application Priority Data

Apr. 26, 2019   (CN) .......................... 201910346450.9

(51) Int. Cl.
*H04W 72/1263*   (2023.01)
*H04L 5/00*   (2006.01)
(Continued)

(52) U.S. Cl.
CPC ....... *H04W 72/1263* (2013.01); *H04L 5/0053* (2013.01); *H04L 5/0094* (2013.01);
(Continued)

(58) Field of Classification Search
CPC . H04W 72/1263; H04W 72/23; H04W 80/02; H04W 72/231; H04W 72/232; H04L 5/0094; H04L 5/0053; H04L 5/0098
See application file for complete search history.

(56) References Cited

U.S. PATENT DOCUMENTS

2017/0111852 A1    4/2017   Selen et al.
2018/0343653 A1    11/2018   Guo
(Continued)

FOREIGN PATENT DOCUMENTS

CN    109076364 A    12/2018
EP    3 462 664 A1    4/2019
(Continued)

OTHER PUBLICATIONS

"ETSI TS 138 321 V15.3.0 (Sep. 2018), 5G; NR; Medium Access Control (MAC) protocol specification", 3GPP TS 38.321 version 15.3.0 Release 15), Sep. 2018, 77 pages. (Year: 2018).*
(Continued)

*Primary Examiner* — Brian J. Gillis
*Assistant Examiner* — Chhian (Amy) Ling
(74) *Attorney, Agent, or Firm* — BROOKS KUSHMAN P.C.

(57) ABSTRACT

A method for transmitting indication information and a communications device are provided. The method includes: performing transmission of a medium access control control element MAC CE command, where the MAC CE command is used to instruct to activate N first objects and indicate a mapping relationship between the first objects and codepoints of a transmission configuration indicator field TCI field in downlink control information DCI, the N first objects include transmission configuration indicator states TCI state in M TCI state groups and N−M TCI states, N is a positive integer, and M is an integer less than or equal to N.

13 Claims, 4 Drawing Sheets

---

Perform transmission of a medium access control control element MAC CE command, where the MAC CE command is used to instruct to activate N first objects and indicate a mapping relationship between the first objects and codepoints of a transmission configuration indicator field TCI field in downlink control information DCI ⟶ 201

(51) Int. Cl.
  *H04W 72/23* (2023.01)
  *H04W 72/231* (2023.01)
  *H04W 72/232* (2023.01)
  *H04W 80/02* (2009.01)

(52) U.S. Cl.
  CPC ........... *H04L 5/0098* (2013.01); *H04W 72/23* (2023.01); *H04W 72/231* (2023.01); *H04W 72/232* (2023.01); *H04W 80/02* (2013.01)

(56) References Cited

U.S. PATENT DOCUMENTS

| | | | |
|---|---|---|---|
| 2019/0052344 A1 | 2/2019 | Kundargi et al. | |
| 2019/0082456 A1 | 3/2019 | Kim et al. | |
| 2019/0115955 A1 | 4/2019 | John Wilson et al. | |
| 2019/0207662 A1* | 7/2019 | Zhou .................. | H04W 72/0446 |
| 2020/0100154 A1* | 3/2020 | Cirik .................. | H04W 36/305 |
| 2020/0267734 A1* | 8/2020 | Khoshnevisan ...... | H04W 80/02 |
| 2020/0314708 A1* | 10/2020 | Jassal .................... | H04W 16/28 |
| 2020/0314818 A1 | 10/2020 | Jin et al. | |
| 2020/0314858 A1* | 10/2020 | Xu ......................... | H04W 72/21 |
| 2021/0329575 A1 | 10/2021 | Li | |
| 2021/0385803 A1* | 12/2021 | Shi ........................ | H04W 48/08 |
| 2022/0167322 A1* | 5/2022 | Takahashi ............. | H04B 7/0874 |
| 2022/0338227 A1* | 10/2022 | Cirik ..................... | H04W 72/23 |

FOREIGN PATENT DOCUMENTS

| | | |
|---|---|---|
| JP | 2022-527775 A | 6/2022 |
| RU | 2669191 C1 | 10/2018 |
| WO | 2018232090 A1 | 12/2018 |
| WO | 2019049096 A1 | 3/2019 |
| WO | 2020/197308 A1 | 10/2020 |

OTHER PUBLICATIONS

European Search Report in Application No. 20795826.5 Dated May 17, 2022.
RU Office Action in Application No. 2021133953/07(071797) Dated Apr. 22, 2020.
"Summary of AI: 7.2.8.2 Enhancements on Multi-TRP/Panel Transmission of Offline Discussion" 3GPP TSG RAN WG1 Meeting #96bis, Huawei, HiSilicon, R1-190abcd, Apr. 8, 2019.
"Further Discussion on Multi-TRP Transmission" 3GPP TSG RAN WG1 #96bis, vivo, R1-1905817, Apr. 8, 2019.
Ericsson., "Remaining details of beam management," 3GPP TSG-RAN WG1 #91, R1-1721366, pp. 1-15, (Dec. 1, 2017).
MediaTek Inc., "MAC CEs for Beam Management and CSI Acquisition," 3GPP TSG-RAN WG2 Meeting AH-1801, R2-1800653, pp. 1-6, (Jan. 26, 2018).
NTT Docomo, Inc., "Enhancements on multi-TRP/panel transmission," 3GPP TSG RAN WG1 #96, R1-1902812, pp. 1-25, (Mar. 1, 2019).
ZTE. et al., "Consideration on Enhancement of TCI-State MAC CE for Muliti-TRP transmission," 3GPP TSG-RAN WG2 Meeting #105 bis, R2-1904136, pp. 1-7, (Apr. 12, 2019).
Vivo., "Discussion on remaining issues on multi-TRP operation," 3GPP TSG RAN WG1 #100bis, R1-2001678, pp. 1-17, (Apr. 30, 2020).
JP Office Action dated Jan. 10, 2023 as received in Application No. 2021-563065.
"MAC CE signaling impact of enhanced TCI indication framework" 3GPP TSG RAN WG2 Meeting #105bis, Ericsson, R2-1903572, Apr. 8, 2019.
"Enhancements on Multi-TRP and Multi-panel Transmission" 3GPP TSG RAN WG1 #96bis, ZTE, R1-1904013, Apr. 8, 2019.
Written Opinion and International Search Report in Application No. PCT/CN2020//086107 dated Nov. 4, 2021.

* cited by examiner

Perform transmission of a medium access control control element MAC CE command, where the MAC CE command is used to instruct to activate N first objects and indicate a mapping relationship between the first objects and codepoints of a transmission configuration indicator field TCI field in downlink control information DCI ⸺ 201

METHOD FOR TRANSMITTING INDICATION INFORMATION AND COMMUNICATIONS DEVICE

CROSS-REFERENCE TO RELATED APPLICATIONS

This application is continuation application of PCT International Application No. PCT/CN2020/086107 filed on Apr. 22, 2020, which claims priority to Chinese Patent Application No. 201910346450.9, filed in China on Apr. 26, 2019, the disclosures of which are incorporated herein by reference in their entireties.

TECHNICAL FIELD

This disclosure relates to the field of communications technologies, and in particular, to a method for transmitting indication information and a communications device.

BACKGROUND

In the related art, in a beam indication mechanism for physical downlink shared channel (PDSCH), a network device uses radio resource control (RRC) signaling to configure M transmission configuration indicator states (TCI state) in a higher layer parameter PDSCH-Config. A value of M depends on a capability parameter capability maxNumberActiveTCI-PerBWP of a terminal. Each TCI state includes a quasi co-location (QCL) relationship between PDSCH demodulation reference signal (DMRS) ports and reference signals.

The network device may transmit a medium access control control element (MAC CE) command to activate and deactivate the configured TCI states. In the protocol TS38.321 in the related art, a subheader, of a MAC protocol data unit (PDU), carrying a logical channel identifier (LCD) is used to identify a dedicated PDSCH MAC CE command. The command is used to activate or deactivate TCI states, and can activate at most eight TCI states.

The network device indicates PDSCH beam information through a transmission configuration indicator field (TCI field) in DCI. To be specific, each codepoint codepoint in the TCI field (usually three bits) corresponds to one of the at most eight TCI states that are activated by the MAC CE command. The terminal learns, based on the DCI on the received PDCCH, beam information used to receive PDSCH.

The MAC CE command has a variable bit length and has the following fields:

Serving cell identity (Serving Cell ID): indicates a serving cell identity to which the MAC CE command is applied, with a length of five bits.

Bandwidth part identifier (BWP ID): indicates a DL BWP to which the MAC CE command is applied, with a length of two bits.

Ti: indicates an activated/deactivated state of a TCI state of TCI-StateId i if the TCI state of TCI-StateId i exists; or this field is ignored by a MAC entity if the TCI state of TCI-StateId i does not exist. If the Ti field is set to 1, it indicates that the TCI state of TCI-StateId i is activated and mapped to a codepoint of the TCI field in the DCI. If the Ti field is set to 0, it indicates that the TCI state of TCI-StateId i is deactivated and not mapped to a codepoint of the TCI field in the DCI. Codepoints to which TCI states are mapped are determined based on locations of all TCI states set to 1 in the Ti field. To be specific, the first TCI state set to 1 in the Ti field is mapped to a codepoint value 0, the second TCI state set to 1 in the Ti field is mapped to a codepoint value 1, and so on. The maximum number of activated TCI states is eight.

R: reserved bit, set to 0.

At present, only a design scheme for a one-to-one mapping between the TCI states indicated by the MAC CE command and the codepoints of the TCI field in the DCI is proposed. This cannot meet a requirement for indicating TCI information in a multiple transmission reception point (TRP) scenario and other communication scenarios.

SUMMARY

Embodiments of this disclosure provide a method for transmitting indication information and a communications device.

According to a first aspect, an embodiment of this disclosure provides a method for transmitting indication information, including:

performing transmission of a medium access control control element (MAC CE) command, where the MAC CE command is used to instruct to activate N first objects and indicate a mapping relationship between the first objects and codepoints of a transmission configuration indicator field (TCI field) in downlink control information (DCI), the N first objects include transmission configuration indicator states (TCI state) in M TCI state groups and N–M TCI states, N is a positive integer, and M is an integer less than or equal to N.

According to a second aspect, an embodiment of this disclosure further provides a communications device, including:

a transmission module, configured to perform transmission of a medium access control control element (MAC CE) command, where the MAC CE command is used to instruct to activate N first objects and indicate a mapping relationship between the first objects and codepoints of a transmission configuration indicator field (TCI field) in downlink control information (DCI), the N first objects include transmission configuration indicator states (TCI state) in M TCI state groups and N–M TCI states, N is a positive integer, and M is an integer less than or equal to N.

According to a third aspect, an embodiment of this disclosure further provides a communications device, including a memory, a processor, and a program stored in the memory and capable of running on the processor, where when the program is executed by the processor, the steps of the foregoing method for transmitting indication information are implemented.

According to a fourth aspect, an embodiment of this disclosure further provides a computer-readable storage medium, where the computer-readable storage medium stores a computer program, and when the computer program is executed by a processor, the steps of the foregoing method for transmitting indication information are implemented.

DESCRIPTION OF EMBODIMENTS

The following clearly describes the technical solutions in the embodiments of this disclosure with reference to the accompanying drawings in the embodiments of this disclosure. Apparently, the described embodiments are merely some rather than all of the embodiments of this disclosure. All other embodiments obtained by persons of ordinary skill in the art based on the embodiments of this disclosure shall fall within the protection scope of this disclosure.

In the specification and claims of this application, the term "include" and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates that the following three cases: only A, only B, or both A and B.

In the embodiments of this disclosure, terms such as "an example" or "for example" are used to represent examples, illustrations, or explanations. Any embodiment or design solution described as "an example" or "for example" in the embodiments of this disclosure shall not be interpreted as being preferred or advantageous than other embodiments or design solutions. Specifically, the terms such as "an example" or "for example" are used to present related concepts in a specific manner.

The following describes the embodiments of this disclosure with reference to the accompanying drawings. A method for transmitting indication information and a communications device provided in the embodiments of this disclosure may be applied to a wireless communications system. The wireless communications system may be a 5G system, or an evolved long term evolution (eLTE) system, or a later evolved communications system.

Figures 1, 2:
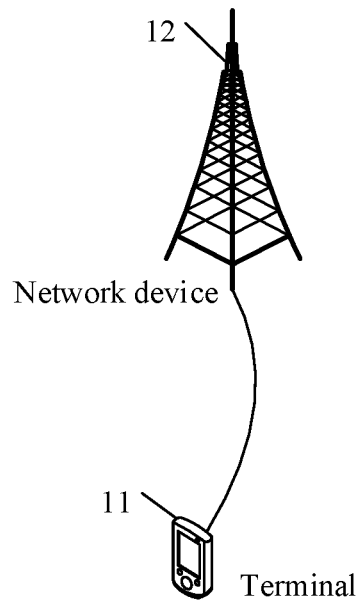
FIG. 1 is a structural diagram of a network system to which an embodiment of this disclosure may be applied.
FIG. 2 is a flowchart of a method for transmitting indication information according to an embodiment of this disclosure.

Referring to FIG. 1, FIG. 1 is a structural diagram of a network system to which an embodiment of this disclosure may be applied. As shown in FIG. 1, the network system includes a terminal 11 and a network device 12. The terminal 11 may be a user terminal or other terminal side devices, for example, a terminal side device such as a mobile phone, a tablet personal computer, a laptop computer, a personal digital assistant (PDA for short), a mobile Internet device (MID), or a wearable device. It should be noted that a specific type of the terminal 11 is not limited in this embodiment of this disclosure. The network device 12 may be a 5G base station, a base station of a later version, or a base station in other communications systems, or may be referred to as a NodeB, an evolved NodeB, a transmission reception point (TRP), an access point (AP), or other terms in the field. Provided that the same technical effects are achieved, the network device is not limited to any particular technical term. In addition, the network device 12 may be a master node (MN) or a secondary node (SN). It should be noted that in this embodiment of this disclosure, the 5G base station is used as only an example, and the network device is not limited to any specific type.

Referring to FIG. 2, FIG. 2 is a flowchart of a method for transmitting indication information according to an embodiment of this disclosure. The method is applied to a communications device, and as shown in FIG. 2, includes the following step:

Step 201. Perform transmission of a medium access control control element (MAC CE) command, where the MAC CE command is used to instruct to activate N first objects and indicate a mapping relationship between the first objects and codepoints of a transmission configuration indicator field (TCI field) in downlink control information (DCI), the N first objects include transmission configuration indicator states (TCI state) in M TCI state groups and N−M TCI states, N is a positive integer, and M is an integer less than or equal to N.

The communications device is a terminal or a network device. When the method for transmitting indication information is applied to a terminal, step 201 can be understood as receiving, by the terminal, the MAC CE command from a network device; and when the method for transmitting indication information is applied to a network device, step 201 can be understood as transmitting, by the network device, the MAC CE command to a terminal.

Figure 3:
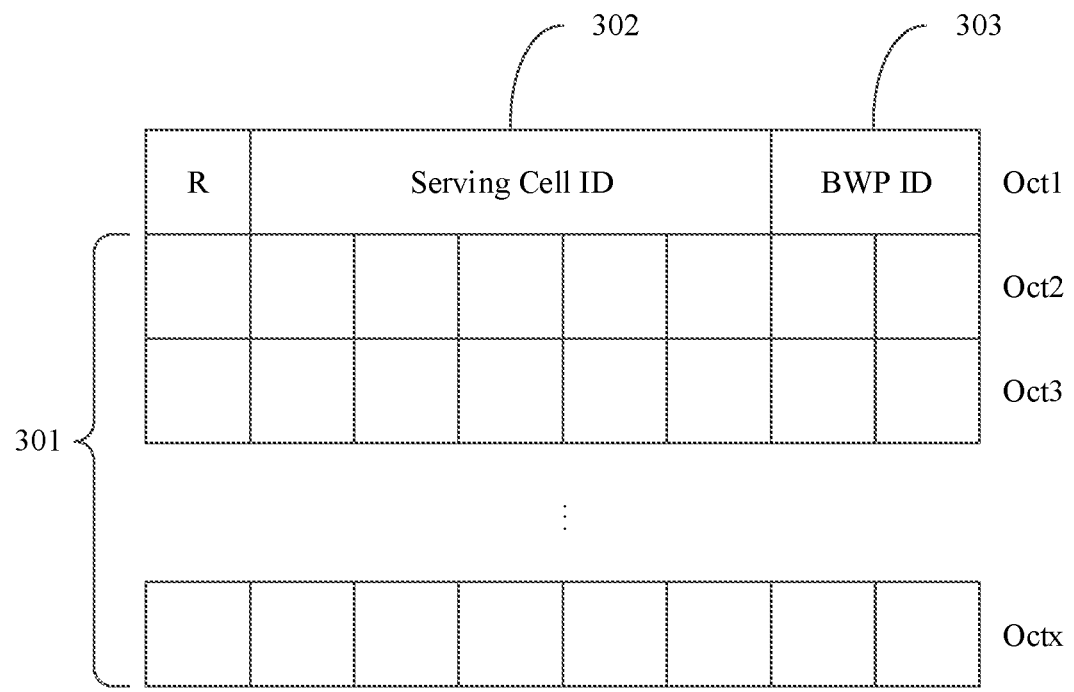
FIG. 3 is a schematic structural diagram of a first MAC CE command in a method for transmitting indication information according to an embodiment of this disclosure.

Specifically, as shown in FIG. 3, the MAC CE command may include a reserved bit R, a first bit field 301, a second bit field 302, and a third bit field 303. The second bit field is used to indicate a serving cell ID, the third bit field is used to indicate a BWP ID, and the first bit field is used to instruct to activate the N first objects. The first bit field is located after the third bit field. A length of the first bit field may be determined based on the number of the first objects.

In this embodiment of this disclosure, when M is equal to 0, the N first objects may include N TCI states; when M is equal to N, the N first objects may include TCI states in N TCI state groups; and when M is a positive integer less than N, the N first objects may include Q TCI states and TCI states in M TCI state groups, a sum of Q and M is equal to N, and Q is a positive integer.

It should be understood that a network may simultaneously transmit multiple MAC CE commands, and different MAC CE commands may indicate different content. In this embodiment, when the N first objects include Q TCI states and TCI states in M TCI state groups, a MAC CE command instructing to activate the Q TCI states and a MAC CE command instructing to activate the TCI states in the M TCI state groups are separate commands. In addition, activating the Q TCI states may be instructed in one MAC CE command or multiple MAC CE commands. Similarly, activating the TCI states in the M TCI state groups may be instructed in one MAC CE command or multiple MAC CE commands.

In an optional embodiment, a reserved bit of the MAC CE command is used to indicate the mapping relationship between the first objects and the codepoints of the transmission configuration indicator fields TCI field in the downlink control information (DCI). For example, when being 0, the reserved bit instructs to activate the TCI states and map the TCI states to the codepoints of the TCI field in the DCI in a one-to-one correspondence; and when being 1, the reserved bit instructs to activate the TCI states in the TCI state groups and map the TCI states to the codepoints of the TCI field in the DCI in a one-to-one correspondence.

In this embodiment, the TCI state group may include one or more TCI states. To be specific, when being 1, the reserved bit may instruct to activate one or more TCI states and map the one or more TCI states to one codepoint of the TCI field in the DCI.

It should be noted that after the MAC CE command instructs to activate the N first objects in this embodiment of this disclosure, other TCI states than the activated N first objects of the TCI states configured by RRC signaling may be understood being in an inactive state.

In this embodiment of this disclosure, when instructing to activate the first TCI objects, the MAC CE command further indicates the mapping relationship between the first objects and the codepoints of the transmission configuration indicator fields TCI field in the downlink control information (DCI), so that the MAC CE command can be used to instruct to activate a TCI state and/or a TCI state in a TCI state group, thereby implementing that each codepoint of the TCI field in the DCI corresponds to one or more TCI states. Therefore, the method for transmitting indication information provided in the embodiments of this disclosure can meet a requirement for indicating TCI information in a multiple TRP scenario and other communication scenarios.

Further, based on the foregoing embodiment, in this embodiment, when M is greater than 0, the MAC CE command includes a first MAC CE command, and the first MAC CE command is used to instruct to activate the TCI states in the M TCI state groups and indicate that the TCI states in the M TCI state groups correspond to M codepoints of the TCI field in the DCI.

In an embodiment of this disclosure, the first MAC CE command includes a first bit field, and the first bit field is used to instruct to activate the TCI states in the M TCI state groups. Specifically, a manner for indicating the TCI states in the TCI state groups may be set based on an actual need and is described in detail below.

In a first optional embodiment, the first bit field includes identifier information of the TCI states in the M TCI state groups, the identifier information of the TCI states is sequentially arranged in the order of the TCI state groups, and identifier information of TCI states in a same TCI state group is consecutive. Specifically, the first bit field may be expressed in the following bit format:

TCI state $ID_{1,1}, \ldots,$ TCI state $ID_{1,H}$,
TCI state $ID_{2,1}, \ldots,$ TCI state $ID_{2,H}$,
...,
TCI state $ID_{M,1}, \ldots,$ TCI state $ID_{M,H}$.

A TCI state $ID_{m,h}$ represents identifier information of the $h^{th}$ TCI state in the $m^{th}$ TCI state group, m is a positive integer less than or equal to M, h is a positive integer less than or equal to H, H is the number of TCI states in a TCI state group, and all TCI state groups have the same number of TCI states.

It should be noted that when identifier information of TCI state is used to indicate to activate a TCI state in a TCI state group, a TCI state corresponding to identifier information indicated in the MAC CE command is in an activated state, and a TCI state corresponding to identifier information of TCI state other than the identifier information indicated in the MAC CE command is in a deactivated state.

It should be understood that when at least two of the M TCI state groups have different numbers of TCI states, a TCI state group identifier (that is, a TCI state group ID) may further be added to help the terminal to recognize a group to which a TCI state belongs. In other words, when at least two of the M TCI state groups have different numbers of TCI states, a corresponding TCI state group identifier is added before or after identifier information of each TCI state in each TCI state group. In this case, the first bit field may be expressed in the following bit format:

Group $ID_1$, TCI state $ID_{1,1}, \ldots,$ TCI state $ID_{1,H1}$,
Group $ID_2$, TCI state $ID_{2,1}, \ldots,$ TCI state $ID_{2,H2}$,
...,
Group $ID_M$, TCI state $ID_{M,1}, \ldots,$ TCI state $ID_{M, HM}$.

Alternatively, the first bit field may be expressed in the following bit format:

TCI state $ID_{1,1}, \ldots,$ TCI state $ID_{1,H1}$, Group $ID_1$
TCI state $ID_{2,1}, \ldots,$ TCI state $ID_{2,H2}$, Group $ID_2$
...,
TCI state $ID_{M, 1}, \ldots,$ TCI state $ID_{M, HM}$, Group $ID_M$.

Group $ID_m$ represents a TCI state group identifier of the $m^{th}$ (m is a positive integer less than or equal to M) TCI state group, Hm is the number of TCI states in the $m^{th}$ TCI state group, and at least two of H1 to HM have different values. It should be understood that when a TCI state group identifier is located before identifier information of all TCI states in a corresponding TCI state group, a TCI state group identifier of the first TCI state group may be omitted; or when a TCI state group identifier is located after identifier information of all TCI states in a corresponding TCI state group, a TCI state group identifier of the $m^{th}$ TCI state group may be omitted. In other words, only one group identifier may be added for two adjacent TCI state groups.

In a second optional embodiment, the first bit field includes H first bit subfields sequentially arranged, each first bit subfield includes M second bit subfields, and H is a maximum value in the numbers of TCI states in all TCI state groups, where the $j^{th}$ second bit subfield in the $i^{th}$ first bit subfield includes identifier information of the $i^{th}$ TCI state in the $j^{th}$ TCI state group, i is a positive integer less than or equal to H, and j is a positive integer less than or equal to M.

In this embodiment, the first bit field may be expressed in the following bit format:

TCI state $ID_{1,1}$, TCI state $ID_{2,1}, \ldots,$ TCI state $ID_{M,1}$,
TCI state $ID_{1,2}$, TCI state $ID_{2,2}, \ldots,$ TCI state $ID_{M,2}$,
...,
TCI state $ID_{1,H}$, TCI state $ID_{2,H}, \ldots,$ TCI state $ID_{M,H}$.

In a third optional embodiment, the first bit field includes H first bit subfields sequentially arranged, each first bit subfield includes M second bit subfields, and H is a maximum value in the numbers of TCI states in all TCI state groups. In particular, all TCI state groups have the same number of TCI states.

The $1^{st}$ first bit subfield instructs to activate the first TCI state in the M TCI state groups based on a bitmap, the $j^{th}$ second bit subfield in the $i^{th}$ first bit subfield includes identifier information of the $i^{th}$ TCI state in the $j^{th}$ TCI state group, i is an integer greater than 1 and less than or equal to H, and j is a positive integer less than or equal to M.

In this embodiment, the number of bits in the $1^{st}$ first bit subfield is the same as the number of TCI states configured by the network device for the terminal. For example, if 128 TCI states are configured in RRC signaling, the $1^{st}$ first bit subfield includes 128 bits, and the 128 bits include M bits whose value is 1, with values of the remaining bits being 0. A bit value of 1 indicates that a TCI state corresponding to the bit is in an activated state, and a bit value of 0 indicates that a TCI state corresponding to the bit is in a deactivated state.

It should be noted that when at least two of the M TCI state groups have different numbers of TCI states, A target bit sequences are added to a first TCI state group, the first TCI state group includes B TCI states, and a sum of A and B is equal to a maximum value in the numbers of TCI states in all TCI state groups.

In this embodiment, the target bit sequence includes a bit sequence prescribed in a protocol or identifier information of a TCI state in the B TCI states. The bit sequence prescribed in the protocol is a special bit sequence, that is, an invalid bit sequence. For example, the value of H being 2 is used as an example. For example, the first TCI state group includes one TCI state whose identifier information is TCI state $ID_{1,1}$. In this case, after the target bit sequence is added, the resulting first TCI state group includes {TCI state $ID_{1,1}$, special bit sequence}, or the first TCI state group includes {TCI state $ID_{1,1}$, TCI state $ID_{1,1}$}.

In this case, in the first bit field, in addition to identifier information indicating the valid TCI state, an invalid target bit sequence is further indicated.

In a fourth optional embodiment, TCI state groups with the same number of TCI states in the M TCI state groups are indicated in the first MAC CE command.

Because TCI state groups indicated in each first MAC CE command include the same number of TCI states, the terminal can recognize a group to which a TCI state belongs in each MAC CE command.

Specifically, for a bit format of a first bit field in each MAC CE command, reference may be made to the foregoing embodiment. Details are not repeated herein.

Further, when M is less than N, the MAC CE command further includes a second MAC CE command, and the second MAC CE command is used to instruct to activate the N−M TCI states and indicate that the N−M TCI states correspond to N−M codepoints of the TCI field in the DCI.

In this embodiment of this disclosure, the second MAC CE command includes a target bit field, and the target bit field is used to indicate an activated state of multiple TCI states through a bitmap. Each bit is used to indicate an activated state of a corresponding TCI state. At present, activated state of a maximum of eight TCI states can be indicated, that is, there are a maximum of eight bits with a value of "1" in the target bit field.

It should be noted that each of the TCI state groups includes at least one TCI state. The numbers of TCI states of the M TCI state groups may be all the same, partially the same, or completely different from each other. To be specific, in an optional embodiment, at least two of the M TCI state groups have the same number of TCI states. In another optional embodiment, at least two of the M TCI state groups have different numbers of TCI states.

It should be understood that in this embodiment of this disclosure, the TCI state may be used to determine beam information of a downlink channel such as PDSCH or a downlink reference signal.

To help better understand this disclosure, a specific implementation process of this disclosure is described in detail below.
1. A network device configures K TCI states through RRC signaling.
2. The network device transmits a MAC CE command used to activate/deactivate a TCI state of a PDSCH.
3. The network device transmits a physical downlink control channel (PDCCH) to a terminal, and indicates TCI state information of the PDSCH in a TCI field of DCI.

The MAC CE command used to activate the TCI state of the PDSCH includes the following schemes.
Scheme 1:
Different values of a reserved bit R are used to indicate a mapping relationship between activated TCI states and codepoints of a TCI field in DCI.

If R is set to 0, it indicates that a manner in the related art is used. That is, a maximum of eight TCI states are activated by the MAC CE command, and each activated TCI state is mapped to one codepoint of the TCI field in the DCI.

If R is set to 1, it indicates that the manner in this disclosure is used. That is, a maximum of N (for example, a maximum value of N is 8 in the related art) groups of TCI states are activated by the MAC CE command, each group includes M TCI states (A value of M is 2 in accordance with the related art. As an extension, a subsequent evolved technology can allow the value of M to be greater than 2), and an activated TCI state in each group is mapped to one codepoint in the TCI field in the DCI.

Scenario 1. In the MAC CE command, bits after the BWP ID field are used to instruct to activate N×M TCI states. A specific bit format may be as follows:
TCI state $ID_{1,1}, \ldots,$ TCI state $ID_{1,M}$,
TCI state $ID_{2,1}, \ldots,$ TCI state $ID_{2,M}$,
$\ldots,$
TCI state $ID_{N,1}, \ldots,$ TCI state $ID_{N,M}$.

Scenario 2. In the MAC CE command, bits after the BWP ID field are used to indicate N×M TCI states. A specific bit format may be as follows:
TCI state $ID_{1,1}, \ldots,$ TCI state $ID_{N,1}$,
TCI state $ID_{1,2}, \ldots,$ TCI state $ID_{N,2}$,
$\ldots,$
TCI state $ID_{1,M}, \ldots,$ TCI state $ID_{N,M}$.

Scenario 3. In the MAC CE command, for bits after the BWP ID field, bitmapping used for Ti in the related art is used to instruct to activate the first TCI state in each group of TCI states. For bits following the bits used for indication for the first TCI state in each group of TCI states, a TCI state ID manner is used for other activated TCI states in each group of TCI states.
Scheme 2:
Different values of a reserved bit R are used to indicate a mapping relationship between activated TCI states and codepoints of a TCI field in DCI.

If R is set to 0, it indicates that a manner in the related art is used. That is, a maximum of eight TCI states are activated by the MAC CE command, and each activated TCI state is mapped to one codepoint of the TCI field in the DCI.

If R is set to 1, it indicates that the manner in this disclosure is used. That is, a maximum of N (for example, a maximum value of N is 8 in the related art) groups of TCI states are activated by the MAC CE command, each group includes a maximum of M TCI states (A value of M is 2 in accordance with the related art. As an extension, a subsequent evolved technology can allow the value of M to be greater than 2). That is, each group of activated TCI states may include one or more TCI states. In addition, an activated TCI state in each group is mapped to one codepoint in the TCI field in the DCI.

Scenario 1. M is set to 2, for a TCI state group including one activated TCI state, a special bit sequence may be added to the TCI state group to form one TCI state group together with the one TCI state.

For example, the first group of TCI states includes {TCI state special bit sequence}, and is mapped to one codepoint of the TCI field in the DCI.

Scenario 2. M is set to 2, for a TCI state group including one activated TCI state, the one activated TCI state is repeatedly used M times in the TCI state group to form one TCI state group.

For example, the first group of TCI states includes {TCI state $ID_{1,1}$, TCI state $ID_{1,1}$}, and is mapped to one codepoint of the TCI field in the DCI.

Scenario 3. A TCI state group ID is added. In this case, the first bit field may be expressed in the following bit format:

Group $ID_1$, TCI state $ID_{1,1}$, ..., TCI state $ID_{1,M1}$,
Group $ID_2$, TCI state $ID_{2,1}$, ..., TCI state $ID_{2,M2}$,
...,
Group $ID_N$, TCI state $ID_{N,1}$, ..., TCI state $ID_{N,MN}$.

Alternatively, the first bit field may be expressed in the following bit format:

TCI state $ID_{1,1}$, ..., TCI state $ID_{1,M1}$, Group $ID_1$
TCI state $ID_{2,1}$, ..., TCI state $ID_{2,M2}$, Group $ID_2$
...,
TCI state $ID_{N,1}$, ..., TCI state $ID_{N,MN}$, Group $ID_N$.

M1, M2, ..., MN are the numbers of TCI states in all TCI state groups.

Scheme 3:

Different values of a reserved bit R are used to indicate a mapping relationship between activated TCI states and codepoints of a TCI field in DCI, and TCI states activated by multiple MAC CE commands are combined to be mapped to codepoints of the TCI field in the DCI. For example, the first MAC CE command is used to instruct to activate the TCI states, and the second MAC CE command is used to instruct to activate the TCI states in the TCI state groups.

If R is set to 0, the first MAC CE command activates N1 TCI states, and each activated TCI state is mapped to one codepoint of the TCI field in the DCI, with a total of N1 codepoints being used for mapping.

If R is set to 1, the second MAC CE command activates TCI states in N2 groups of TCI states, each activated group of TCI states includes M TCI states, and each activated group of TCI states is mapped to one codepoint of the TCI field in the DCI, with a total of N2 codepoints being used for mapping.

According to the above two MAC CE commands, the terminal learns that the activated N1 TCI states and the TCI states in the N2 TCI state groups are mapped to the total of N1+N2 codepoints of the TCI field in the DCI. Herein, N1+N2 does not exceed the maximum value N (for example, N is 8 in the related art).

This disclosure proposes a new MAC CE command design method that can allow each codepoint of a TCI field in DCI to correspond to one or more TCI states, thereby supporting TCI information indication in a multiple TRP scenario and other communication scenarios. This method can increase flexibility of PDSCH beam information indication, be compatible with PDSCH beam information indication methods in the related art, and reduce signaling overheads for PDSCH beam information indication.

Figure 4:
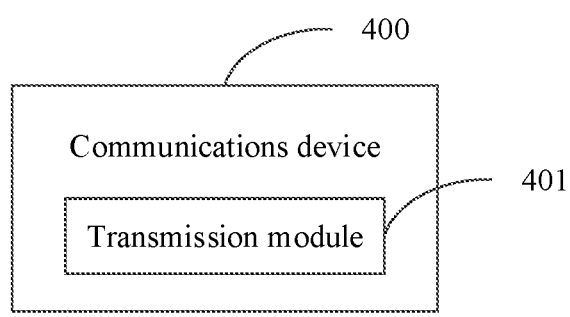
FIG. 4 is a structural diagram of a communications device according to an embodiment of this disclosure.

Referring to FIG. 4, FIG. 4 is a structural diagram of a communications device according to an embodiment of this disclosure. As shown in FIG. 4, the communications device 400 includes:

a transmission module 401, configured to perform transmission of a medium access control control element (MAC CE) command, where the MAC CE command is used to instruct to activate N first objects and indicate a mapping relationship between the first objects and codepoints of a transmission configuration indicator field (TCI field) in downlink control information (DCI), the N first objects include transmission configuration indicator states (TCI state) in M TCI state groups and N−M TCI states, N is a positive integer, and M is an integer less than or equal to N.

Optionally, a reserved bit of the MAC CE command is used to indicate the mapping relationship between the first objects and the codepoints of the transmission configuration indicator fields TCI field in the downlink control information (DCI).

Optionally, when M is greater than 0, the MAC CE command includes a first MAC CE command, and the first MAC CE command is used to instruct to activate the TCI states in the M TCI state groups and indicate that the TCI states in the M TCI state groups correspond to M codepoints of the TCI field in the DCI.

Optionally, the first MAC CE command includes a first bit field, and the first bit field is used to instruct to activate the TCI states in the M TCI state groups.

Optionally, the first bit field includes identifier information of the TCI states in the M TCI state groups, the identifier information of the TCI states is sequentially arranged in the order of the TCI state groups, and identifier information of TCI states in a same TCI state group is consecutive.

Optionally, when at least two of the M TCI state groups have different numbers of TCI states, a corresponding TCI state group identifier is added before or after identifier information of each TCI state in each TCI state group.

Optionally, the first bit field includes H first bit subfields sequentially arranged, each first bit subfield includes M second bit subfields, and H is a maximum value in the numbers of TCI states in all TCI state groups, where the $j^{th}$ second bit subfield in the $i^{th}$ first bit subfield includes identifier information of the $i^{th}$ TCI state in the $j^{th}$ TCI state group, i is a positive integer less than or equal to H, and j is a positive integer less than or equal to M;

or the $1^{st}$ first bit subfield instructs to activate the first TCI state in the M TCI state groups based on a bitmap, the $j^{th}$ second bit subfield in the $i^{th}$ first bit subfield includes identifier information of the $i^{th}$ TCI state in the $j^{th}$ TCI state group, i is an integer greater than 1 and less than or equal to H, and j is a positive integer less than or equal to M.

Optionally, when at least two of the M TCI state groups have different numbers of TCI states, A target bit sequences are added to a first TCI state group, the first TCI state group includes B TCI states, and a sum of A and B is equal to a maximum value in the numbers of TCI states in all TCI state groups.

Optionally, the target bit sequence includes a bit sequence prescribed in a protocol or identifier information of a TCI state in the B TCI states.

Optionally, TCI state groups with the same number of TCI states in the M TCI state groups are indicated in the first MAC CE command.

Optionally, at least two of the M TCI state groups have the same number of TCI states.

Optionally, at least two of the M TCI state groups have different numbers of TCI states.

Optionally, when M is less than N, the MAC CE command further includes a second MAC CE command, and the second MAC CE command is used to instruct to activate the N−M TCI states and indicate that the N−M TCI states correspond to N−M codepoints of the TCI field in the DCI.

Optionally, each of the TCI state groups includes at least one TCI state.

The communications device provided in this embodiment of this disclosure can implement the processes that are implemented by the communications device in the method embodiment of FIG. 2. To avoid repetition, details are not described herein again.

Figure 5:
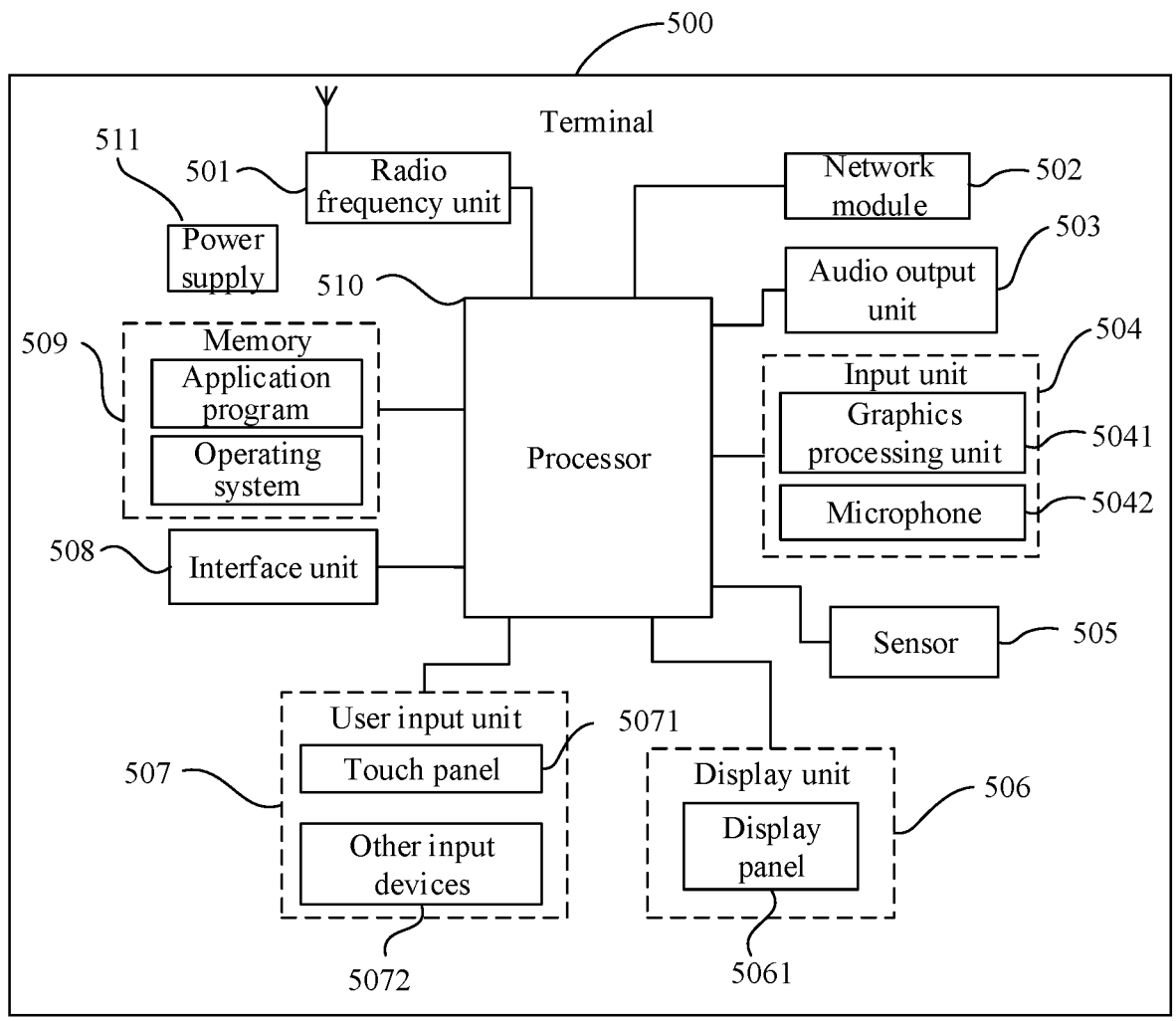
FIG. 5 is a structural diagram of a terminal according to an embodiment of this disclosure.

FIG. 5 is a schematic diagram of a hardware structure of a terminal for implementing the embodiments of this disclosure.

The terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. Persons skilled in the art may understand that the terminal structure shown in FIG. 5 does not constitute a limitation on the terminal. The terminal may include more or fewer components than those shown in the figure, or combine some of the components, or have different arrangements of components. In this embodiment of this disclosure, the terminal includes but is not limited to a mobile phone, a tablet computer, a laptop computer, a personal digital assistant, an in-vehicle terminal, a wearable device, a pedometer, and the like.

The radio frequency unit 501 is configured to perform transmission of a medium access control control element (MAC CE) command, where the MAC CE command is used to instruct to activate N first objects and indicate a mapping relationship between the first objects and codepoints of a transmission configuration indicator field (TCI field) in downlink control information (DCI), the N first objects include transmission configuration indicator states (TCI state) in M TCI state groups and N−M TCI states, N is a positive integer, and M is an integer less than or equal to N.

Optionally, a reserved bit of the MAC CE command is used to indicate the mapping relationship between the first objects and the codepoints of the transmission configuration indicator fields TCI field in the downlink control information (DCI).

Optionally, when M is greater than 0, the MAC CE command includes a first MAC CE command, and the first MAC CE command is used to instruct to activate the TCI states in the M TCI state groups and indicate that the TCI states in the M TCI state groups correspond to M codepoints of the TCI field in the DCI.

Optionally, the first MAC CE command includes a first bit field, and the first bit field is used to instruct to activate the TCI states in the M TCI state groups.

Optionally, the first bit field includes identifier information of the TCI states in the M TCI state groups, the identifier information of the TCI states is sequentially arranged in the order of the TCI state groups, and identifier information of TCI states in a same TCI state group is consecutive.

Optionally, when at least two of the M TCI state groups have different numbers of TCI states, a corresponding TCI state group identifier is added before or after identifier information of each TCI state in each TCI state group.

Optionally, the first bit field includes H first bit subfields sequentially arranged, each first bit subfield includes M second bit subfields, and H is a maximum value in the numbers of TCI states in all TCI state groups, where the $j^{th}$ second bit subfield in the $i^{th}$ first bit subfield includes identifier information of the $i^{th}$ TCI state in the $j^{th}$ TCI state group, i is a positive integer less than or equal to H, and j is a positive integer less than or equal to M;

or the $1^{st}$ first bit subfield instructs to activate the first TCI state in the M TCI state groups based on a bitmap, the $j^{th}$ second bit subfield in the $i^{th}$ first bit subfield includes identifier information of the $i^{th}$ TCI state in the $i^{th}$ TCI state group, i is an integer greater than 1 and less than or equal to H, and j is a positive integer less than or equal to M.

Optionally, when at least two of the M TCI state groups have different numbers of TCI states, A target bit sequences are added to a first TCI state group, the first TCI state group includes B TCI states, and a sum of A and B is equal to a maximum value in the numbers of TCI states in all TCI state groups.

Optionally, the target bit sequence includes a bit sequence prescribed in a protocol or identifier information of a TCI state in the B TCI states.

Optionally, TCI state groups with the same number of TCI states in the M TCI state groups are indicated in the first MAC CE command.

Optionally, at least two of the M TCI state groups have the same number of TCI states.

Optionally, at least two of the M TCI state groups have different numbers of TCI states.

Optionally, when M is less than N, the MAC CE command further includes a second MAC CE command, and the second MAC CE command is used to instruct to activate the N−M TCI states and indicate that the N−M TCI states correspond to N−M codepoints of the TCI field in the DCI.

Optionally, each of the TCI state groups includes at least one TCI state.

It should be understood that in this embodiment of this disclosure, the radio frequency unit 501 may be configured to receive and transmit a signal in an information receiving/transmitting process or a call process. Specifically, the radio frequency unit 501 receives downlink data from a base station, and transmits the downlink data to the processor 510 for processing; and transmits uplink data to the base station. Usually, the radio frequency unit 501 includes but is not limited to an antenna, at least one amplifier, a transceiver, a coupler, a low noise amplifier, a duplexer, and the like. In addition, the radio frequency unit 501 may further communicate with a network and other devices through a wireless communications system.

The terminal provides wireless broadband Internet access for a user by using the network module 502, for example, helping the user transmit and receive e-mails, browse web pages, and access streaming media.

The audio output unit 503 may convert audio data into an audio signal, and output the audio signal as sound, where the audio data is received by the radio frequency unit 501 or the network module 502, or stored in the memory 509. In addition, the audio output unit 503 may further provide an audio output (for example, a call signal reception sound or a message reception sound) related to a specific function performed by the terminal 500. The audio output unit 503 includes a speaker, a buzzer, a receiver, and the like.

The input unit 504 is configured to receive an audio signal or a video signal. The input unit 504 may include a graphics processing unit (GPU) 5041 and a microphone 5042. The graphics processing unit 5041 processes image data of a still picture or a video obtained by an image capture apparatus (for example, a camera) in an image capture mode or a video capture mode. A processed image frame may be displayed on the display unit 506. An image frame processed by the graphics processing unit 5041 may be stored in the memory 509 (or another storage medium), or may be transmitted by the radio frequency unit 501 or the network module 502. The microphone 5042 may receive a sound, and can process the sound into audio data. In a phone call mode, processed audio data may be converted into a format for transmission by the radio frequency unit 501 to a mobile communications base station, and output as such.

The terminal 500 further includes at least one sensor 505, for example, an optical sensor, a motion sensor, and other sensors. Specifically, the optical sensor may include an ambient light sensor and a proximity sensor. The ambient light sensor may adjust luminance of the display panel 5061 based on brightness of ambient light, and the proximity sensor may turn off the display panel 5061 and/or backlight when the terminal 500 moves close to an ear. As a motion sensor, an accelerometer sensor may detect magnitudes of accelerations in various directions (there are usually three axes), may detect the magnitude and direction of gravity when the terminal is still, and may be configured for terminal posture recognition (for example, landscape/portrait mode switching, related gaming, or magnetometer posture calibration), functions associated with vibration recognition (for example, pedometer or tapping), or the like. The sensor 505 may further include a fingerprint sensor, a pressure sensor, an iris sensor, a molecular sensor, a gyroscope, a barometer, a hygrometer, a thermometer, or an infrared sensor. Details are not described herein.

The display unit 506 is configured to display information input by the user or information provided to the user. The display unit 506 may include the display panel 5061. The display panel 5061 may be configured in a form of a liquid crystal display (LCD), an organic light-emitting diode (OLED), or the like.

The user input unit 507 may be configured to receive input digit or character information, and generate key signal input related to user settings and function control of the terminal. Specifically, the user input unit 507 includes a touch panel 5071 and other input devices 5072. The touch panel 5071 is also referred to as a touchscreen, and may collect a touch operation of the user on or near the touch panel (for example, an operation performed on or near the touch panel 5071 by the user by using any appropriate object or accessory such as a finger or a stylus). The touch panel 5071 may include two parts: a touch detection apparatus and a touch controller. The touch detection apparatus detects a touch orientation of the user, and detects a signal brought by the touch operation, and transmits the signal to the touch controller. The touch controller receives touch information from the touch detection apparatus, converts the touch information into touch point coordinates, transmits the touch point coordinates to the processor 510, and receives and executes a command transmitted by the processor 510. In addition, the touch panel 5071 may be implemented in a plurality of forms, for example, as a resistive, capacitive, infrared, or surface acoustic wave touch panel. In addition to the touch panel 5071, the user input unit 507 may further include the other input devices 5072. Specifically, the other input devices 5072 may include but are not limited to a physical keyboard, a function key (for example, a volume control key or a power on/off key), a track ball, a mouse, and a joystick. Details are not described herein.

Further, the touch panel 5071 may cover the display panel 5061. When detecting a touch operation on or near the touch panel 5071, the touch panel 5071 transmits the touch operation to the processor 510 to determine a type of a touch event. Then, the processor 510 provides a corresponding visual output on the display panel 5061 based on the type of the touch event. In FIG. 5, the touch panel 5071 and the display panel 5061 serve as two separate components to implement input and output functions of the terminal. However, in some embodiments, the touch panel 5071 and the display panel 5061 may be integrated to implement the input and output functions of the terminal. This is not specifically limited herein.

The interface unit 508 is an interface for connecting an external apparatus to the terminal 500. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 508 may be configured to receive input (for example, data information and electric power) from the external apparatus, and transmit the received input to one or more elements in the terminal 500; or may be configured to transmit data between the terminal 500 and the external apparatus.

The memory 509 may be configured to store software programs and various types of data. The memory 509 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 509 may include a high-speed random access memory, and may further include a nonvolatile memory, for example, at least one magnetic disc storage device or a flash memory device, or other non-volatile solid-state storage devices.

The processor 510 is a control center of the terminal, and is connected to all components of the terminal by using various interfaces and lines. By running or executing a software program and/or module stored in the memory 509 and calling data stored in the memory 509, the processor 510 executes various functions of the terminal and processes data, so as to perform overall monitoring on the terminal. The processor 510 may include one or more processing units. Optionally, the processor 510 may integrate an application processor and a modem processor. The application processor mainly processes an operating system, a user interface, an application program, and the like. The modem processor mainly processes wireless communication. It can be understood that the modem processor may alternatively not be integrated into the processor 510.

The terminal 500 may further include a power supply 511 (for example, a battery) that supplies power to the components. Optionally, the power supply 511 may be logically connected to the processor 510 by using a power management system, so as to implement functions such as charging management, discharging management, and power consumption management by using the power management system.

In addition, the terminal 500 includes some functional modules that are not shown. Details are not described herein.

Optionally, an embodiment of this disclosure further provides a terminal, including a processor 510, a memory 509, and a computer program stored in the memory 509 and capable of running on the processor 510. When the computer program is executed by the processor 510, the processes of the embodiments of the foregoing methods for transmitting indication information are implemented, and a same technical effect can be achieved. To avoid repetition, details are not described herein again.

Figure 6:
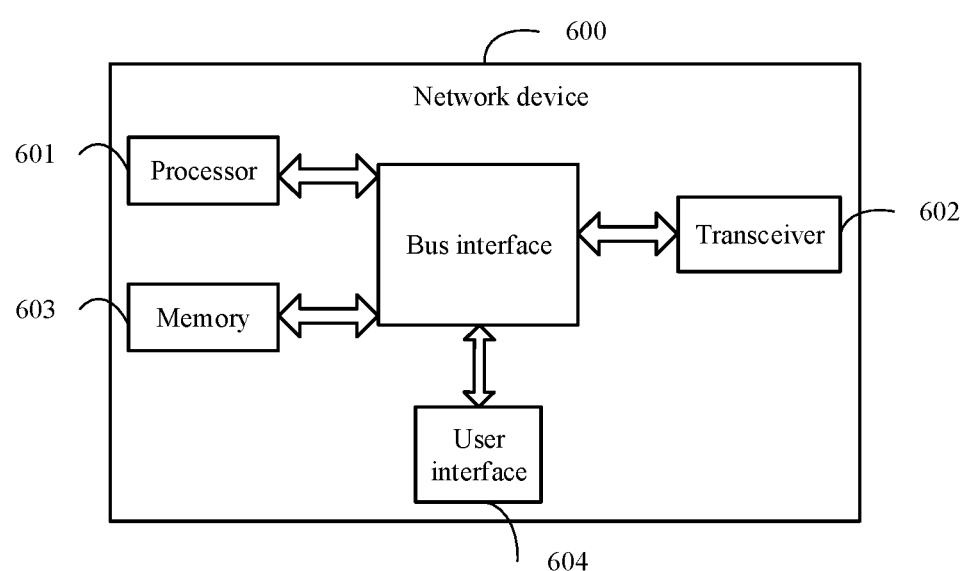
FIG. 6 is a structural diagram of a network device according to an embodiment of this disclosure.

Referring to FIG. 6, FIG. 6 is a structural diagram of another network device according to an embodiment of this disclosure. As shown in FIG. 6, the network device 600 includes a processor 601, a transceiver 602, a memory 603, and a bus interface.

The transceiver 602 is configured to transmit a medium access control control element (MAC CE) command, where the MAC CE command is used to instruct to activate N first objects and indicate a mapping relationship between the first objects and codepoints of a transmission configuration indicator field (TCI field) in downlink control information (DCI), the N first objects include transmission configuration indicator states (TCI state) in M TCI state groups and N–M TCI states, N is a positive integer, and M is an integer less than or equal to N.

Optionally, a reserved bit of the MAC CE command is used to indicate the mapping relationship between the first objects and the codepoints of the transmission configuration indicator fields TCI field in the downlink control information (DCI).

Optionally, when M is greater than 0, the MAC CE command includes a first MAC CE command, and the first MAC CE command is used to instruct to activate the TCI states in the M TCI state groups and indicate that the TCI states in the M TCI state groups correspond to M codepoints of the TCI field in the DCI.

Optionally, the first MAC CE command includes a first bit field, and the first bit field is used to instruct to activate the TCI states in the M TCI state groups.

Optionally, the first bit field includes identifier information of the TCI states in the M TCI state groups, the identifier information of the TCI states is sequentially arranged in the order of the TCI state groups, and identifier information of TCI states in a same TCI state group is consecutive.

Optionally, when at least two of the M TCI state groups have different numbers of TCI states, a corresponding TCI state group identifier is added before or after identifier information of each TCI state in each TCI state group.

Optionally, the first bit field includes H first bit subfields sequentially arranged, each first bit subfield includes M second bit subfields, and H is a maximum value in the numbers of TCI states in all TCI state groups, where
- the $j^{th}$ second bit subfield in the $i^{th}$ first bit subfield includes identifier information of the $i^{th}$ TCI state in the $j^{th}$ TCI state group, i is a positive integer less than or equal to H, and j is a positive integer less than or equal to M;
- or the $1^{st}$ first bit subfield instructs to activate the first TCI state in the M TCI state groups based on a bitmap, the $j^{th}$ second bit subfield in the $i^{th}$ first bit subfield includes identifier information of the $i^{th}$ TCI state in the $i^{th}$ TCI state group, i is an integer greater than 1 and less than or equal to H, and j is a positive integer less than or equal to M.

Optionally, when at least two of the M TCI state groups have different numbers of TCI states, A target bit sequences are added to a first TCI state group, the first TCI state group includes B TCI states, and a sum of A and B is equal to a maximum value in the numbers of TCI states in all TCI state groups.

Optionally, the target bit sequence includes a bit sequence prescribed in a protocol or identifier information of a TCI state in the B TCI states.

Optionally, TCI state groups with the same number of TCI states in the M TCI state groups are indicated in the first MAC CE command.

Optionally, at least two of the M TCI state groups have the same number of TCI states.

Optionally, at least two of the M TCI state groups have different numbers of TCI states.

Optionally, when M is less than N, the MAC CE command further includes a second MAC CE command, and the second MAC CE command is used to instruct to activate the N–M TCI states and indicate that the N–M TCI states correspond to N–M codepoints of the TCI field in the DCI.

Optionally, each of the TCI state groups includes at least one TCI state.

In FIG. 6, a bus architecture may include any number of interconnected buses and bridges, and specifically connects together circuits that are of one or more processors represented by the processor 601 and a memory represented by the memory 603. The bus architecture may further interconnect various other circuits such as a peripheral device, a voltage regulator, and a power management circuit. These are all common sense in the art, and therefore are not further described in this specification. The bus interface provides an interface. The transceiver 602 may be a plurality of components, that is, the transceiver 602 includes a transmitter and a receiver, and provides a unit for communicating with various other apparatuses on a transmission medium. For different user equipment, the user interface 604 may also be an interface capable of externally or internally connecting a required device, and the connected device includes but is not limited to a keypad, a display, a speaker, a microphone, a joystick, and the like.

The processor 601 is responsible for management of the bus architecture and general processing, and the memory 603 may store data for use by the processor 601 when the processor 601 performs an operation.

Optionally, an embodiment of this disclosure further provides a network device, including a processor 601, a memory 603, and a computer program stored in the memory 603 and capable of running on the processor 601. When the computer program is executed by the processor 601, the processes of the embodiments of the methods for transmitting indication information are implemented, with the same technical effects achieved. To avoid repetition, details are not described herein again.

An embodiment of this disclosure further provides a computer-readable storage medium. The computer-readable storage medium stores a computer program, and when the computer program is executed by a processor, the processes of the embodiments of the methods for transmitting indication information on a network device side according to the embodiments of this disclosure are implemented, or when the computer program is executed by a processor, the processes of the embodiments of the methods for transmitting indication information on a terminal side according to the embodiments of this disclosure are implemented, with the same technical effect achieved. To avoid repetition, details are not described herein again. For example, the computer-readable storage medium is a read-only memory (ROM for short), a random access memory (RAM for short), a magnetic disk, an optical disc, or the like.

It should be noted that the terms "comprise", "include", or any of their variants in this specification are intended to cover a non-exclusive inclusion, such that a process, method, article, or apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing embodiments, persons skilled in the art can clearly understand that the method in the foregoing embodiments may be implemented by software on a necessary universal hardware platform or by hardware only. In most cases, the former is an example though. Based on such an understanding, the technical solutions of this disclosure essentially or the part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a base station, or the like) to perform the methods described in the embodiments of this disclosure.

The embodiments of this disclosure are described above with reference to the accompanying drawings, but this disclosure is not limited to these embodiments. These embodiments are only illustrative rather than restrictive. Inspired by this disclosure, persons of ordinary skill in the art can still derive a plurality of variations without departing from the essence of this disclosure and the protection scope of the claims. All these variations shall fall within the protection of this disclosure.

What is claimed is:

1. A method for transmitting indication information, comprising:
    performing transmission of a medium access control control element (MAC CE) command, wherein the MAC CE command is used to instruct to activate N first objects and indicate a mapping relationship between the first objects and codepoints of a transmission configuration indicator field (TCI field) in downlink control information (DCI), the N first objects comprise transmission configuration indicator states (TCI state) in M TCI state groups and N-M TCI states, N is a positive integer, and M is an integer less than or equal to N;
    wherein when M is greater than or equal to 2, the MAC CE command comprises a first MAC CE command, and the first MAC CE command is used to instruct to activate the TCI states in the M TCI state groups and indicate that the TCI states in the M TCI state groups correspond to M codepoints of the TCI field in the DCI;
    wherein the first MAC CE command comprises a first bit field, and the first bit field is used to instruct to activate the TCI states in the M TCI state groups;
    wherein the first bit field comprises identifier information of the TCI states in the M TCI state groups, the identifier information of the TCI states is sequentially arranged in the order of the TCI state groups, and identifier information of TCI states in a same TCI state group is consecutive;
    wherein when M is less than N, the MAC CE command further comprises a second MAC CE command, and the second MAC CE command is used to instruct to activate the N-M TCI states and indicate that the N-M TCI states correspond to N-M codepoints of the TCI field in the DCI,
    wherein TCI state groups in the M TCI state groups are indicated in the first MAC CE command,
    wherein the first bit field is expressed in a bit format of TCI state $ID_{M,H}$,
    TCI state $ID_{M,H}$ represents identifier information of a $h^{th}$ TCI state in the $m^{th}$ TCI state group, m is a positive integer less than or equal to M, h is a positive integer less than or equal to H, H is the number of TCI states in a TCI state group, and all TCI state groups have the same number of TCI states.

2. The method according to claim 1, wherein the TCI state groups with the same number of TCI states in the M TCI state groups are indicated in the first MAC CE command.

3. The method according to claim 1, wherein at least two of the M TCI state groups have the same number of TCI states.

4. The method according to claim 1, applied to a terminal, wherein the performing the transmission of the MAC CE command comprises receiving, by the terminal, the MAC CE command sent by a network device.

5. The method according to claim 1, applied to a network device, wherein the performing the transmission of the MAC CE command comprises sending, by the network device, the MAC CE command to a terminal.

6. A communications device, comprising a memory, a processor, and a program stored in the memory and capable of running on the processor, wherein when the program is executed by the processor, following steps are implemented:
    performing transmission of a medium access control element (MAC CE) command, wherein the MAC CE command is used to instruct to activate N first objects and indicate a mapping relationship between the first objects and codepoints of a trans mission configuration indicator field (TCI field) in downlink control information (DCI), the N first objects comprise transmission configuration indicator states (TCI state) in M TCI state groups and N-M TCI states, N is a positive integer, and M is an integer less than or equal to N;
    wherein when M is greater than or equal to 2, the MAC CE command comprises a first MAC CE command, and the first MAC CE command is used to instruct to activate the TCI states in the M TCI state groups and indicate that the TCI states in the M TCI state groups correspond to M codepoints of the TCI field in the DCI;
    wherein the first MAC CE command comprises a first bit field, and the first bit field is used to instruct to activate the TCI states in the M TCI state groups;
    wherein the first bit field comprises identifier information of the TCI states in the M TCI state groups, the identifier information of the TCI states is sequentially arranged in the order of the TCI state groups, and identifier information of TCI states in a same TCI state group is consecutive;
    wherein when M is less than N, the MAC CE command further comprises a second MAC CE command, and the second MAC CE command is used to instruct to activate the N-M TCI states and indicate that the N-M TCI states correspond to N-M codepoints of the TCI field in the DCI,
    wherein TCI state groups in the M TCI state groups are indicated in the first MAC CE command,
    wherein the first bit field is expressed in a bit format of TCI state $ID_{M,H}$,
    TCI state $ID_{M,H}$ represents identifier information of a $h^{th}$ TCI state in the $m^{th}$ TCI state group, m is a positive integer less than or equal to M, h is a positive integer less than or equal to H, H is the number of TCI states in a TCI state group, and all TCI state groups have the same number of TCI states.

7. The communications device according to claim 6, wherein the TCI state groups with the same number of TCI states in the M TCI state groups are indicated in the first MAC CE command.

8. The communications device according to claim 6, wherein at least two of the M TCI state groups have the same number of TCI states.

9. The communications device according to claim 6, wherein when the communication device is a terminal, the performing the transmission of the MAC CE command comprises receiving, by the communications device, the MAC CE command sent by a network device.

10. The communications device according to claim 6, wherein when the communication device is a network device, the performing the transmission of the MAC CE command comprises sending, by the communications device, the MAC CE command to a terminal.

11. A non-transitory computer-readable storage medium, wherein the non-transitory computer-readable storage medium stores a computer program, and when the computer program is executed by a processor, a communication device is caused to implement:

performing transmission of a medium access control element (MAC CE) command, wherein the MAC CE command is used to instruct to activate N first objects and indicate a mapping relationship between the first objects and codepoints of a transmission configuration indicator field (TCI field) in downlink control information (DCI), the N first objects comprise transmission configuration indicator states (TCI state) in M TCI state groups and N-M TCI states, N is a positive integer, and M is an integer less than or equal to N;

wherein when M is greater than or equal to 2, the MAC CE command comprises a first MAC CE command, and the first MAC CE command is used to instruct to activate the TCI states in the M TCI state groups and indicate that the TCI states in the M TCI state groups correspond to M codepoints of the TCI field in the DCI;

wherein the first MAC CE command comprises a first bit field, and the first bit field is used to instruct to activate the TCI states in the M TCI state groups;

wherein the first bit field comprises identifier information of the TCI states in the M TCI state groups, the identifier information of the TCI states is sequentially arranged in the order of the TCI state groups, and identifier information of TCI states in a same TCI state group is consecutive;

wherein when M is less than N, the MAC CE command further comprises a second MAC CE command, and the second MAC CE command is used to instruct to activate the N-M TCI states and indicate that the N-M TCI states correspond to N-M codepoints of the TCI field in the DCI, wherein TCI state groups in the M TCI state groups are indicated in the first MAC CE command, wherein the first bit field is expressed in a bit format of TCI state $ID_{M,H}$, TCI state $ID_{M,H}$ represents identifier information of a $h^{th}$ TCI state in the $m^{th}$ TCI state group, m is a positive integer less than or equal to M, h is a positive integer less than or equal to H, H is the number of TCI states in a TCI state group, and all TCI state groups have the same number of TCI states.

12. The non-transitory computer-readable storage medium according to claim 11, wherein the TCI state groups with the same number of TCI states in the M TCI state groups are indicated in the first MAC CE command.

13. The non-transitory computer-readable storage medium according to claim 11, wherein at least two of the M TCI state groups have the same number of TCI states.

* * * * *